United States Patent
Wang et al.

(10) Patent No.: US 10,408,622 B2
(45) Date of Patent: Sep. 10, 2019

(54) SYSTEM FOR INCREMENTAL TRAJECTORY ESTIMATION BASED ON REAL TIME INERTIAL SENSING

(71) Applicant: HRL Laboratories, LLC, Mailbu, CA (US)

(72) Inventors: Shuoqin Wang, Oak Park, CA (US); Logan D. Sorenson, Thousand Oaks, CA (US); Hung Nguyen, Los Angeles, CA (US); David Chang, Calabasas, CA (US); Raviv Perahia, Agoura Hills, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 15/825,067

(22) Filed: Nov. 28, 2017

(65) Prior Publication Data

US 2018/0149480 A1    May 31, 2018

Related U.S. Application Data

(60) Provisional application No. 62/427,561, filed on Nov. 29, 2016.

(51) Int. Cl.
*E21B 44/00* (2006.01)
*G01C 21/18* (2006.01)
(Continued)

(52) U.S. Cl.
CPC ............ *G01C 21/18* (2013.01); *E21B 44/005* (2013.01); *G01C 21/08* (2013.01); *G01C 21/165* (2013.01);
(Continued)

(58) Field of Classification Search
CPC .............................. G01C 21/18; E21B 44/005
See application file for complete search history.

(56) References Cited

U.S. PATENT DOCUMENTS 6,453,239 B1 *   9/2002   Shirasaka ............. G01C 21/16
                                                       701/508
2013/0341090 A1   12/2013   Zeinddine et al.
(Continued)

OTHER PUBLICATIONS

D. Obradovic et al., "Fusion of sensor data in Siemens car navigatin system", IEEE Tran.Vehicular Tech., vol. 56, pp. 43-50, (2007).
(Continued)

*Primary Examiner* — Jess Whittington
(74) *Attorney, Agent, or Firm* — Tope-McKay & Associates

(57) ABSTRACT

Described is a system for incremental trajectory estimation of an implement. During operation, the system determines a time span of each stationary period of the implement based on accelerometer and gyroscopic data. Gyroscopic bias is then estimated based on the time span and gyroscopic data. An attitude of the implement is then estimated at each time step based on the estimated gyroscopic bias and gyroscopic data. Further, a traveling distance of the implement is estimated. Finally, a trajectory of the implement is estimated based on the estimated attitude and traveling distance. Given the trajectory estimate, an implement (e.g., drilling platform, vehicle, etc.) can be caused to alter its direction based on the trajectory estimate.

24 Claims, 11 Drawing Sheets

(51) Int. Cl.
*G01C 21/08* (2006.01)
*G01C 21/16* (2006.01)
*G01C 21/20* (2006.01)
*E21B 47/09* (2012.01)
*E21B 7/04* (2006.01)

(52) U.S. Cl.
CPC ............ *G01C 21/20* (2013.01); *E21B 7/04* (2013.01); *E21B 47/09* (2013.01)

(56) References Cited

U.S. PATENT DOCUMENTS

| | | | |
|---|---|---|---|
| 2015/0240620 A1* | 8/2015 | Bang | E21B 47/00 702/11 |
| 2015/0337647 A1 | 11/2015 | Kostov et al. | |
| 2016/0032709 A1* | 2/2016 | Ledroz | G01C 19/02 73/152.54 |
| 2016/0231138 A1* | 8/2016 | Roberts-Thomson | G01C 25/005 |
| 2016/0245070 A1* | 8/2016 | VanSteenwyk | E21B 47/02216 |
| 2016/0281489 A1* | 9/2016 | Dykstra | E21B 44/02 |

OTHER PUBLICATIONS

Jacques Georgy, et al., "Low cost three dimensional navigation solution for RISS/GPS integration using mixture particle filter", IEEE Tran. Vehicular Tech., vol. 59, pp. 599-615, (2010).
"Introduction to wellbore positioning", University of the Highlands & Islands (2012). Survey Calculation Methods, Sect. 7, pp. 48-52.
Paul D. Groves, "Principles of GNSS, Inertial and Multisensor Integrated Navigation Systems," Artech House (2001). Ch.5, Inertial navigation system.
International Preliminary Report on Patentability for PCT/US2017/063544; dated Jan. 4, 2019.
Notification of Transmittal of International Search Report and the Written Opinion of the International Searching Authority for PCT/US2017/063544; dated Mar. 16, 2018.
International Search Report of the International Searching Authority for PCT/US2017/063544; dated Mar. 16, 2018.
Written Opinion of the International Searching Authority for PCT/US2017/063544; dated Mar. 16, 2018.

* cited by examiner

100

SYSTEM FOR INCREMENTAL TRAJECTORY ESTIMATION BASED ON REAL TIME INERTIAL SENSING

CROSS-REFERENCE TO RELATED APPLICATIONS

This is a non-provisional patent application of U.S. Provisional Application No. 62/427,561, filed on Nov. 29, 2016, the entirety of which is hereby incorporated by reference.

BACKGROUND OF INVENTION

(1) Field of Invention

The present invention generally relates to trajectory estimation and, more specifically, to a system for incremental trajectory estimation based on real-time inertial sensing.

(2) Description of Related Art

The gas and oil industry typically directs borehole drilling equipment at great subterranean distances. Borehole drilling is often performed through a "measurement while drilling" (MWD) process where equipment operators use a variety of sensors to estimate the position and trajectory of the drilling equipment. For example, magnetometer-based trajectory estimation is often employed to estimate the borehole trajectory based on magnetometer readings. The magnetometers are used to detect the azimuth of the drilling tools near the drill. By pairing the magnetometers with accelerometers, operators are able to discern both the inclination and azimuth of the subterranean drill, thereby allowing for trajectory estimation.

A problem, however, is that the above measurement have to be done while all of the sensors are in stationary, i.e., in survey mode. Hence, it is desirable to adapt the navigation technique that has been used on autonomous vehicles, self-maneuvering airplanes, and in-door robot movement, etc. In the above-mentioned navigation techniques, inertial sensors including accelerometers, gyros and magnetometers, provide continuous measurements, which are used for real-time trajectory estimation. The problem in adapting these techniques into the downhole drilling application is that these techniques are extremely sensitive to bias drift. The downhole environment is extremely "noisy" (i.e., vibrations, shocks, ambient temperature swings, magnetic interference, etc.). As a result, the bias drift is very difficult to contain to an acceptable low limit. Any deterministic or random bias will lead to large position estimation runaway due to its proportionality to the cube of time.

Thus, a continuing need exists for a fast and accurate trajectory estimation system that operates in real-time (and also post-facto surveying) across various configurations and platforms.

SUMMARY OF INVENTION

This disclosure provides a system for incremental trajectory estimation of an implement. In various embodiments, the system comprises one or more processors and a memory. The memory is, for example, a non-transitory computer-readable medium having executable instructions encoded thereon. Upon execution of the instructions, the one or more processors perform several operations, such as determining a time span of each stationary period of the implement based on accelerometer and gyroscopic data; estimating gyroscopic bias based on the time span and gyroscopic data; estimating attitude at each time step based on the estimated gyroscopic bias, accelerometer and gyroscopic data; estimating a traveling distance of the implement at each time step; and estimating a first trajectory of the implement based on the estimated attitude and traveling distance. The system can then cause the implement (e.g., drilling platform or bit, vehicle, etc.) to alter directional movement based on the trajectory estimate. For example, the implement can be turned to chart a new trajectory.

In another aspect, in estimating attitude at each time step, the attitude is further based on a minimization of difference between estimated and measured magnetometer readings.

In yet another aspect, the system estimates a second trajectory of the implement based on an inertial navigation scheme (INS).

In another aspect, the estimated first and second trajectories are combined using a weight parameter to generate a weighted combined trajectory.

In yet another aspect, an optimized trajectory estimate is generated based on Kalman filtering of the weighted combined trajectory.

In another aspect, the estimated traveling distance at each time are optimized through weighting of initial travelling distance estimation and a traveling distance measurement.

In yet another aspect, the traveling distance is determined based on a velocity distribution over time.

In yet another aspect, the traveling distance is calculated using a sine wave approximation between two stations as a function of time.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
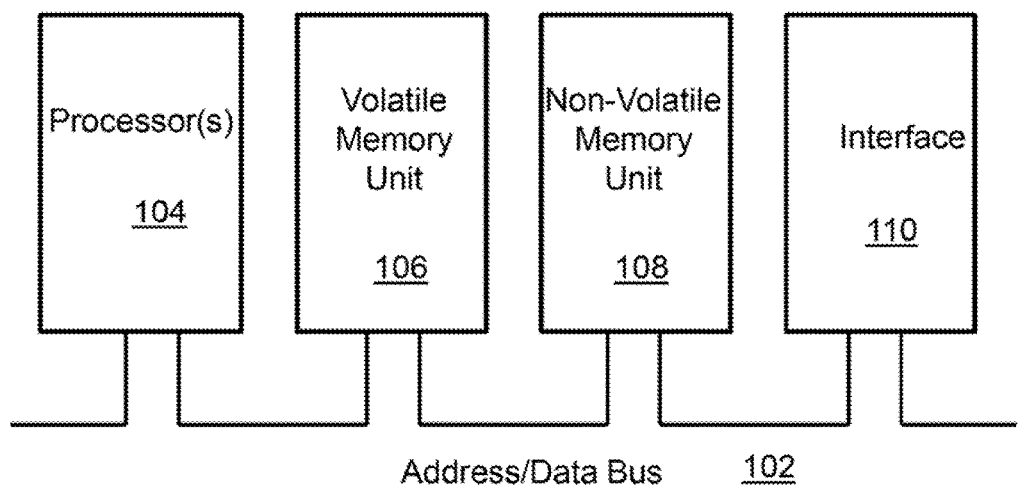
FIG. 1 is a block diagram depicting the components of a system according to various embodiments of the present invention.
Figure 1:
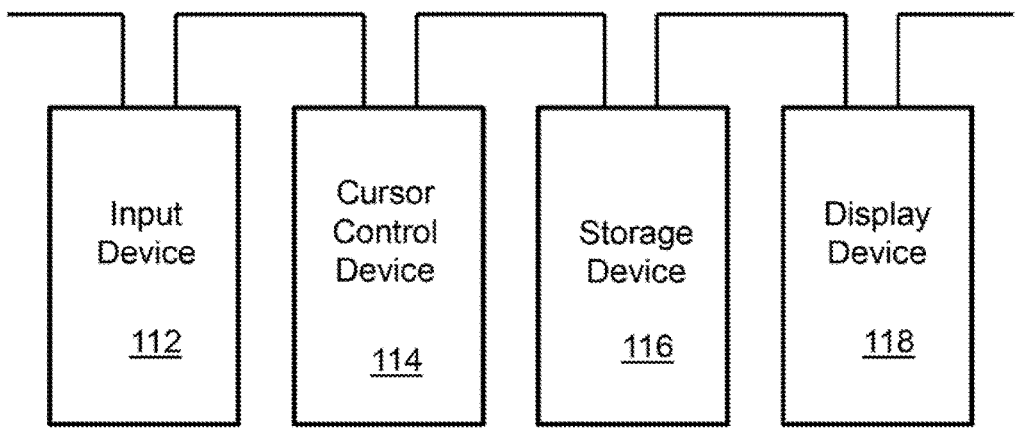

The present invention generally relates to trajectory estimation and, more specifically, to a system for incremental trajectory estimation based on real-time inertial sensing. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Subsequently, an introduction provides the reader with a general understanding of the present invention. Finally, specific details of various embodiment of the present invention are provided to give an understanding of the specific aspects.

(1) List of Incorporated Literature References

The following references are cited throughout this application. For clarity and convenience, the references are listed herein as a central resource for the reader. The following references are hereby incorporated by reference as though fully set forth herein. The references are cited in the application by referring to the corresponding literature reference number, as follows:

1. "Fusion of sensor data in Siemens car navigation system", D. Obradovic et al., IEEE Tran. Vehicular Tech., Vol. 56, 43, (2007).
2. "Low cost three dimensional navigation solution for RISS/GPS integration using mixture particle filter", Jacques Georgy, et al., IEEE Tran. Vehicular Tech., Vol. 59, 599, (2010).
3. "Introduction to wellbore positioning", University of the Highlands & Islands (2012).
4. "Principles of GNSS, Inertial and Multisensor Integrated Navigation Systems," Paul D. Groves, Artech House (2001).

(2) Principal Aspects

Various embodiments of the invention include three "principal" aspects. The first is a system for incremental trajectory estimation. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
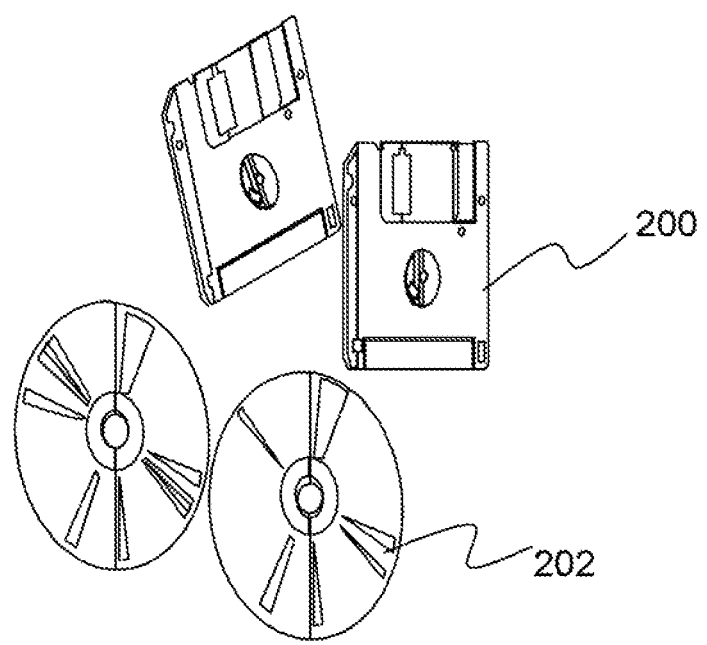
FIG. 2 is an illustration of a computer program product embodying an aspect of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Introduction

This disclosure provides a system and method for rapid position and trajectory estimation of an implement (drilling equipment, vehicle, etc.) based on real-time inertial sensing. The system allows for accuracies exceeding conventional magnetometer based techniques (as used in borehole drilling) and is much more reliable than existing inertial sensing (INS) methods (as used in vehicles). Some unique characteristics of the process described herein include real-time estimation of the attitude; the incremental angular integration over time to estimate the attitude; the real-time travelling distance estimation, etc. These aspects are described in further detail below.

The system can be used in real-time (and also post-facto surveying) across various configurations and platforms to provide for trajectory estimation of an implement. The implement is any object or item that is traversing or otherwise traveling to provide for trajectory estimation. As can be appreciated by those skilled in the art, there are several applications for such trajectory estimation. The trajectory estimation can be used, for example, by the system to cause the implement to alter directional movement (e.g., turn, stop, etc.) based on the trajectory estimate.

In a drilling application, the implement is the drilling equipment (e.g., drill tip or drill bit platform with sensors, etc.). For example, the system and/or method can be used in a standalone software tool application for wellbore surveying that provides faster and more reliable (convergence guaranteed) position estimation than state-of-the-art tools. It can be also used as an aiding sensor for a real-time autonomous drilling system to direct and/or otherwise navigate subterranean drilling equipment. For example, the drilling equipment can be manipulated to alter drilling directions of the implement based on the trajectory estimate to alter the actual drilling trajectory. If, for example, the trajectory estimate shows that the drilling equipment (i.e., implement) is off a preselected course, the operator can use the necessary steering components of the drilling equipment to cause the drilling equipment to change drilling direction toward the preselected course or destination.

In addition to drilling applications, the system can also be employed to any other field that requires trajectory estimation and/or autonomous navigation. For example, the system can be used in navigation products or vehicles/platforms requiring precise navigation through position detection and trajectory estimation. For example, a vehicle (i.e., the implement) can be caused to turn or otherwise navigate a roadway based on the trajectory estimate. In one aspect, the vehicle systems cause the vehicle to accelerate, decelerate, and/or turn to maintain the trajectory estimate (and vehicle) within the roadway or predefined course. Specific details regarding the trajectory estimation process are provided below.

(4) Specific Details of Various Embodiments

As noted above, this disclosure provides a system and method for incremental trajectory estimation of an implement. The general process is illustrated in the flow chart as provided in FIG. 3. As shown, the system starts by sensing inputs 300 (acquiring input data) at incremental stations. The system continues by determining 302 the time span of each stationary period, after which gyro bias is estimated 304. Attitude estimation 306 is then performed at each time step. Additionally, traveling distance at each time step is estimated 308. Finally, the trajectory is estimated 310 based on the attitude and traveling distance.

Figure 3:
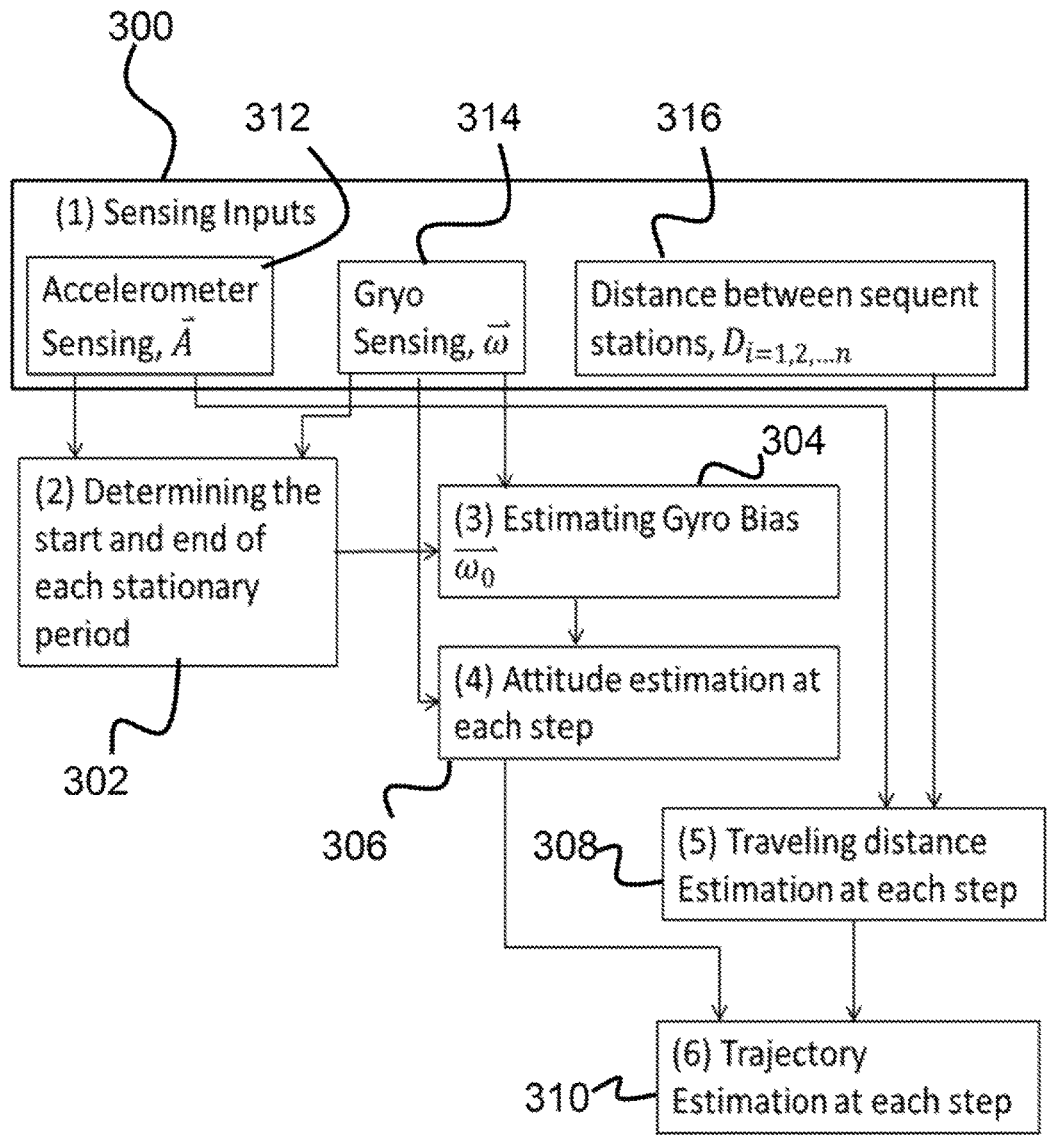
FIG. 3 is a flow chart illustration a process for incremental trajectory estimation according to various embodiments of the present invention.

Provided below are further details regarding each procedure as illustrated in FIG. 3. For further understanding and in order to demonstrate each procedure, a laboratory experiment was conducted imitating the oil borehole drilling application. In the experiment, a person walked a round trip with a total distance of 400 meters, and total time about 10 minutes. An inertial measurement unit (IMU) was carried by the person which measures and records accelerometer and gyro readings at the rate of 100 Hz. 20 stops were made during the trip, with the distance between each stop being measured. The procedures and corresponding examples to the laboratory experiment are provided below.

(4.1) Inputs

During operation, the system acquires measurement data at each sampling period (e.g., 10 mini-second in the demonstration) and saves the measurement data in a memory. Measurement data includes, for example, accelerometer data 312, gyroscopic data 314, and the distance 316 between sequential data sampling stations. It is needed to save a certain amount of data as the function of time, at least, from one station to the next. These saved accelerometer and gyro data would be used later for attitude and trajectory estimation in between the two stations.

(4.2) Determining the Time Span of Each Stationary Period.

In order to automatically identify the time span of each stationary period, the system employs the following criteria:

$$\|\vec{a}\| < \epsilon_a,$$ (a)

$$\|\vec{\omega}\| < \epsilon_\omega,$$ (b)

$$\Delta t > t_0$$ (c)

The first (a), (b) inequality are used to find if the platform (e.g., vehicle, drilling equipment, etc.) carrying the sensors has been in the stop motion or not by checking if the norms of measured acceleration vector $\|\vec{a}\|$ and the angular rate vector $\|\vec{\omega}\|$ are smaller than their respective thresholds. The third (c) inequality requests the stationary period $\Delta t$ has to be at least longer than certain minimum period of time $t_0$. Although not limited thereto, in oil drilling applications, there are at least 5 minutes of stationary time for adding a new section of pipe in, and there are at least 2 minutes of stationary time in order to fulfill the survey task. The minimum time is set up in order to guarantee that the system catches the surveying period rather than no-surveying short stopping moments.

There are certain alternatives in implementing the first two criteria. Instead of checking the norm of the vector, which needs to calculate (the square root of) the sum of squares, it can only check if the magnitude of one component of the vector is under certain threshold. For instance, if a vehicle only moves in approximately 2-D level, then it would be convenient to use the pitch or the roll component of the gyro and/or accelerometer for defining the stationary moments. In some other scenarios, instead of using the norm of the vector, it can be more accurate to use the norm of the difference of the vector.

Figure 4A:
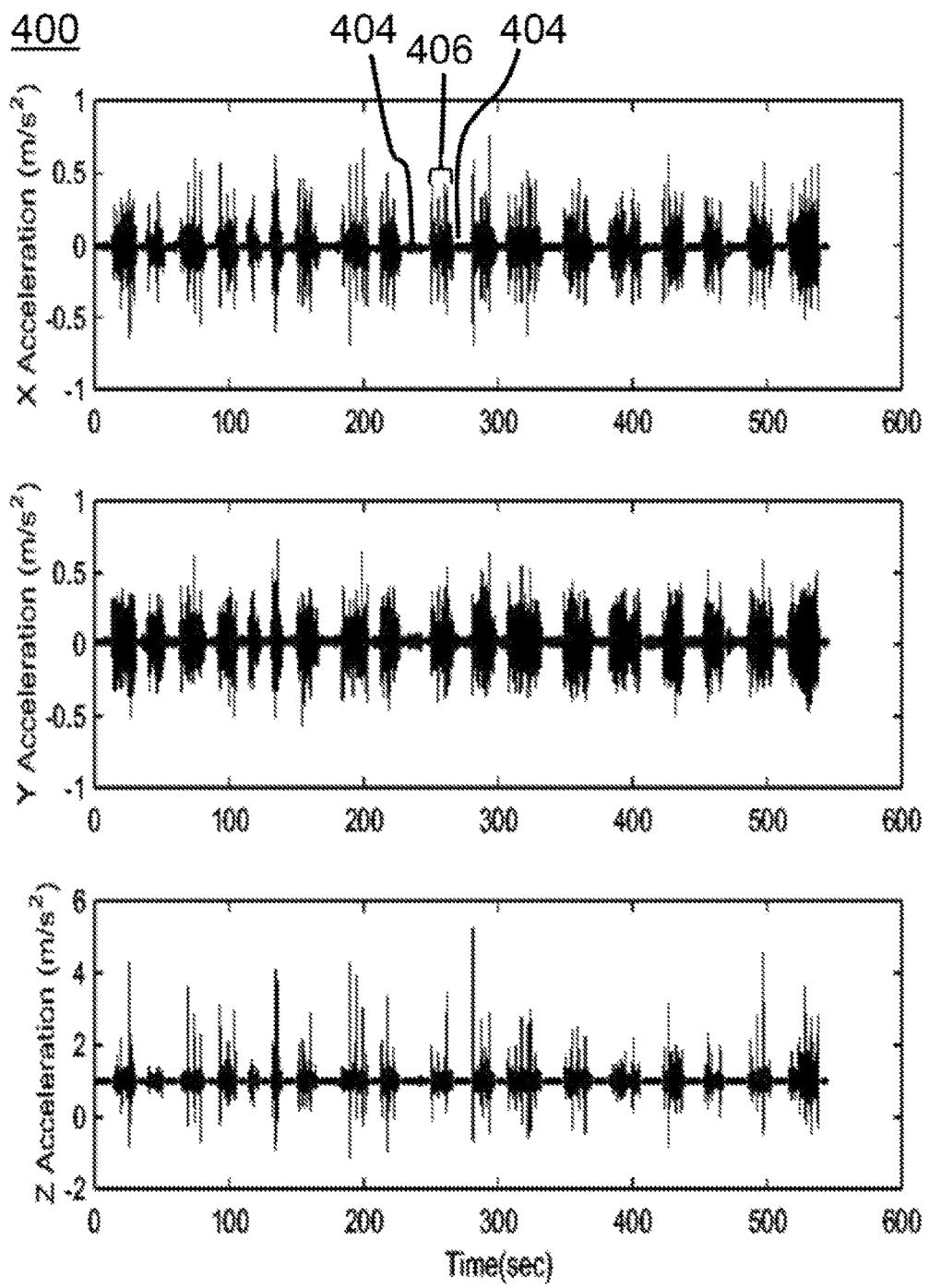
FIG. 4A is an illustration of accelerometer readings during a round trip.
Figure 4B:
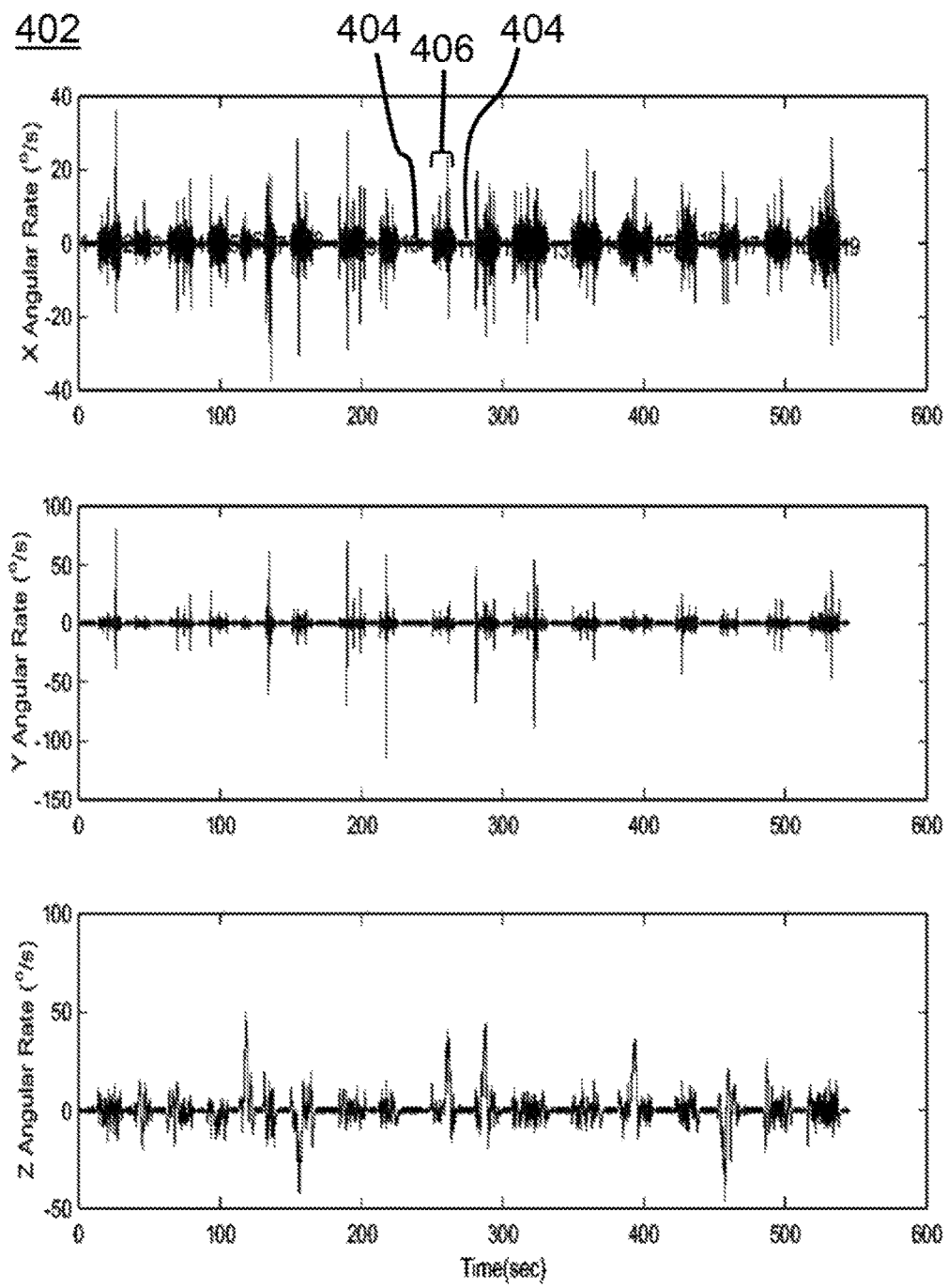
FIG. 4B is an illustration of gyroscope readings during a round trip.

In the demonstration, the system checks the acceleration component and the angular-rate component of the rolling direction (Y direction in the demonstration) under their respective thresholds, and checks the time span to be longer than 5 seconds. FIGS. 4A and 4B plots the measured accelerometer 400 and gyro 402 vectors, respectively, as a function of time during a trip of the platform. The stationary part of data is identified and marked with as breaks 404 between the plot measurements 406. The code for automatically identifying these quiet periods 404 are implemented in Matlab®, or with any other suitable software or system.

(4.3) Gyroscopic Bias Estimation

The gyro or gyroscopic bias is calculated as the average of gyro readings during the stationary periods, and then subtract them from sequent gyro readings until the bias are renewed in the next survey station. Here the average of gyro readings at the stationary periods are approximated as gyro biases of three axes (i.e., b_gx, b_gy, b_gz). Sequential gyro readings would need to subtract these biases. This step is important due to relatively large bias instability related to microelectromechanical (MEMs) based gyro sensors. More accurately, gyroscopic bias estimation should take into account the earth rate.

The earth rate is ignored here because the earth rate is much smaller than the gyro noise due to angular random walk. Moreover, the implementation of subtraction of the earth rate from the gyro bias is complicated since it needs to use the attitude of the sensors in the subtraction. However, as it will be shown in the next step, the attitude of sensors can only be accurately calculated after the gyro-biases have been subtracted.

(4.4) Attitude Estimation at Each Time Step

The attitude at each time step is represented by a set of Euler angles in the local navigation frame. The Euler angles are referred to as the three angles of azimuth, inclination and the tool-face. The attitude vector at each time step is updated as follows.

First, the DCM (directional cosine matrix) is designated based on the local attitude at the starting point, which includes azimuth (A), inclination (I) and toolface (T), as follows:

$$C_b^n(t_0) = \begin{bmatrix} cAcIcT - sAsT & -cAcIsT - sAcT & cAsI \\ sAcIcT + cAsT & cAcT - sAcIsT & sAsI \\ -sIcT & sIsT & cI \end{bmatrix}.$$

In the above equation, c represents the trigonometric function cosine, and s represents the function sine. As noted above, A, I, and T represent attitude, inclination, and toolface, respectively.

The DCM are renewed as the following equation in sequence:

$$C_b^n(t_0+i\Delta t) = C_b^n(t_0+(i-1)\Delta t)(I+\Omega_{ib}^b(t_0+(i-1)\Delta t)\Delta t)$$

In the above equation, I is the identity matrix. $\Omega_{ib}^n = [\omega_{ib}^b \times]$ is the skew-symmetric matrix which follows the convention that if a vector is $$v = \begin{bmatrix} v_1 \\ v_2 \\ v_3 \end{bmatrix},$$

it has its corresponding s-s matrix defined as $$S(v) = \begin{bmatrix} 0 & -v_3 & v_2 \\ v_3 & 0 & -v_1 \\ -v_2 & v_1 & 0 \end{bmatrix}.$$

$\omega_{ib}^b(t_0+(i-1)\Delta t)$ are the measured gyro angular rates at the prior time.

Finally, the attitude (i.e., A, I, T) at the present time can be calculated using $C_b^n(t_0+i\Delta t)$, according to the following three equations:

$$A = a\tan\left(\frac{C(2,3)}{C(1,3)}\right)$$

$$I = a\cos(C(3,3))$$

$$T = a\tan\left(-\frac{C(3,2)}{C(3,1)}\right)$$

In the above three equations, "a tan" and "a cos" are inverse tangent and cosine functions, respectively. Further, C denotes the 3 by 3 matrix of $C_b^n$.

Figure 5A:
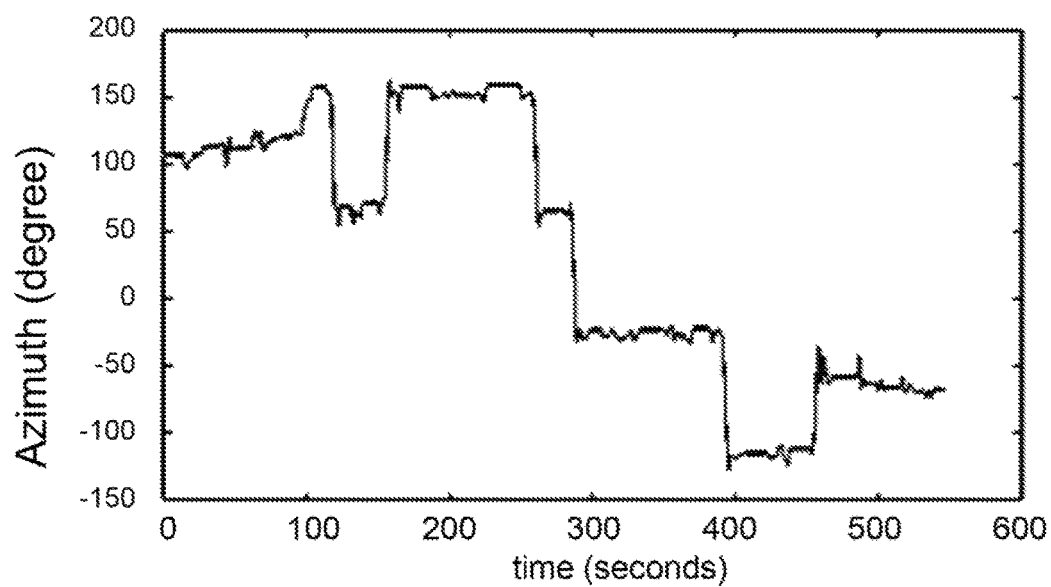
FIG. 5A is a chart depicting calculated azimuth angles as a function of time.
Figure 5B:
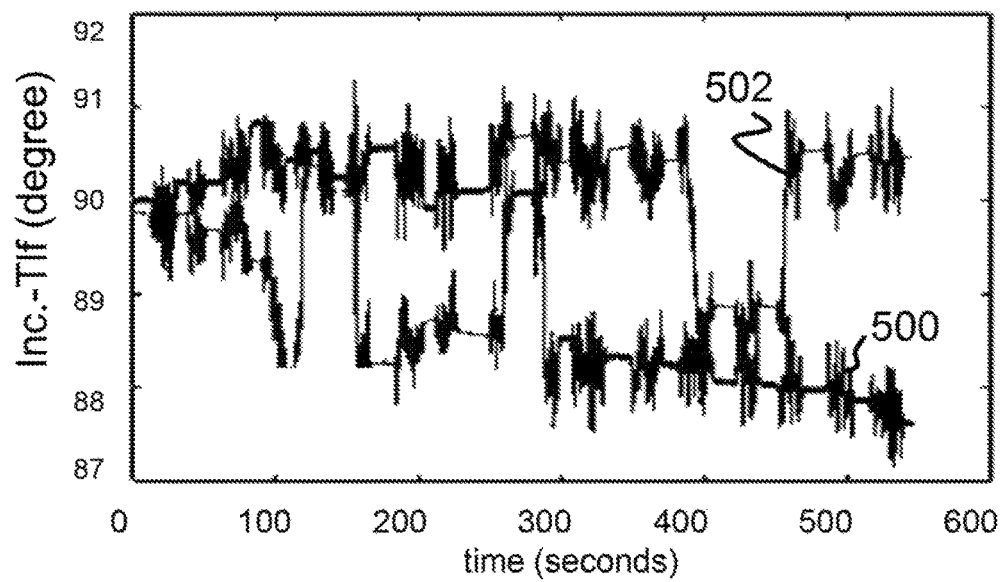
FIG. 5B is a chart depicting calculated inclination and toolface angles as a function of time.

For further understanding, FIGS. 5A and 5B demonstrate the calculated results of attitude (A, I, T) at each time step of the round trip, with stationary periods being depicted between measurement periods. As shown in FIG. 5A, most of the angular change are due to azimuth changes. Alternatively and as shown in FIG. 5B, the inclination 500 and toolface 502 angles keep approximately the same as the beginning of time for the system. These estimates conforms with the known knowledge of the experiment in that the operator was travelling along a hallway of the building with mostly left-right turns and very little up and down movement, hence only the azimuth angles changed a lot, while the inclination and toolface angles changed little.

(4.5) Estimation of Traveling Distance at Each Time Step

As noted above, the system also proceeds to estimate the traveling distance at each time step. For example, the following equation can be used to calculate the distance at each time step between two stations (based on velocity distribution):

$$d(i) = \frac{|\vec{v}_i| \cdot \Delta D}{\sum_{i=1}^{n} |\vec{v}_i|}.$$

In the above equation, $\Delta D$ is the distance between two stations, which is acquired when the system acquires measurement data at each sampling period (described above in Section 4.1). Further, $d_{i=1, 2, \ldots, n}$ is the incremental distance and $|\vec{v}_i|$ is the norm of the velocity vector at each time step.

The norm of the velocity vector at each time step is calculated as follows:

$$\vec{v}(i) = \vec{v}(i-1) + \vec{a}(i)t = \vec{v}(i-1) + (C_b^n f_{ib}^b + \vec{g})t,$$

where $C_b^n$ is the DCM, $f_{ib}^b$ is the measured accelerometer signals, and $\vec{g}$ is the gravity field vector which is (0, 0, g) at the local navigation frame. Note that DCM is easily calculated based on the azimuth, inclination and the toolface angles in the local navigation frame (see Section 4.4).

Figure 6:
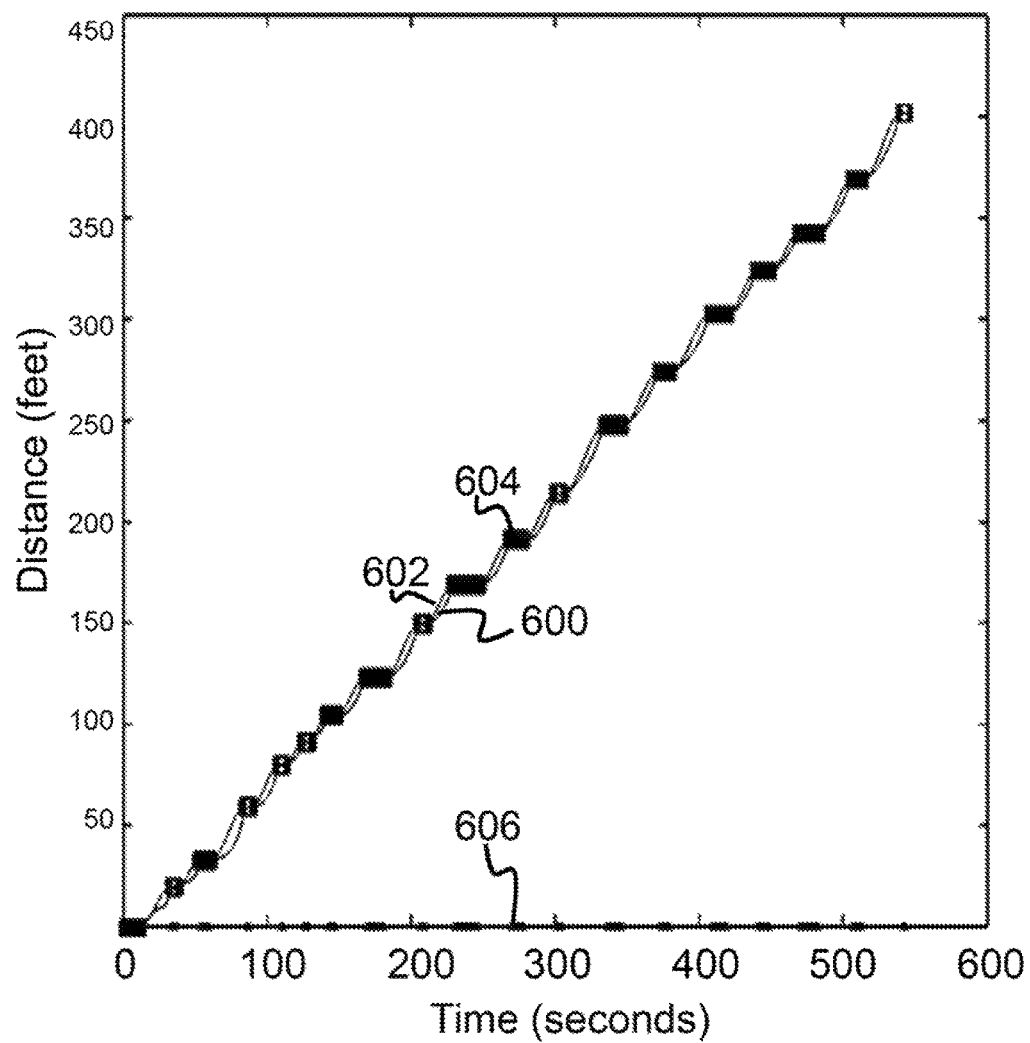
FIG. 6 is a chart depicting estimated distances at each time step for a whole round trip.

An alternative to calculate the incremental distance is to use the sine wave approximation between two stations (based on quasi-linear approximation) as a function of time, which can be formulized as follows:

$$d(i) = \Delta D \cdot \left(1 + \sin\left(-\frac{\pi}{2} + \frac{i}{n}\pi\right)\right)/2,$$

where n is the total steps between two survey stations. Both of the methods provide reasonable distance estimation at each time step. For example, FIG. 6 depicts the estimated distances. As shown, one distance is based on velocity distribution 600 while the other is based on quasi-linear approximation 602, at each time step for the whole round trip. The thick dots 604 are the measured travelled distance at the survey stations, and the dashes below 606 indicate the stationary periods which are calculated based on the above procedure (see Section 4.3).

(4.6) Trajectory Estimation at Each Time Step.

Since the attitude (A, I, T) at each time step and the distance between each time step have been calculated (as demonstrated in Sections 4.4. and 4.5), the trajectory can be easily derived. To be contrasted with the prior art which uses a less accurate tangential method (see Literature Reference Nos. 1 and 2), the system described herein employs the normal minimum curvature method (NMC). The NMC method was detailed in the e-book of "Introduction to wellbore positioning" (see Literature Reference No. 3) and is described in further detail below.

Regarding the NMC method, it is assumed that the prior position is $\vec{P}(-)=(N(-), E(-), D(-))$, where N, E, and D stand for north, east and down coordinates in the local navigation frame. Implicitly, it is also assumed that the position vector at the beginning is either available from other measurement or defined as the origin. The unit vectors of the attitude at the prior and the after (prior and after the present time instant, or the present measurement, or present survey) can be calculated from the attitude at each time step as follows:

$$\hat{u}(-)=(sI(-)sA(-), sI(-)cA(-), cI(-)),\text{ and}$$

$$\hat{u}(+)=(sI(+)sA(+), sI(+)cA(+), cI(+)).$$

The angle subtended by arc that is tangent to both the above two unit vectors is calculated according to the inverse cosine function, i.e., $f = a\cos(\hat{u}(-) \cdot \hat{u}(+))$.

The radius of the arc can be calculated as $R=d/\theta$, where d is the distance between the prior and the after time steps that have been calculated in the prior procedure. The new position vector is now derived as $$\vec{P}(+) = \vec{P}(-) + R \cdot \tan\left(\frac{\theta}{2}\right)\hat{u}(-) + R \cdot \tan\left(\frac{\theta}{2}\right)\hat{u}(+).$$

Figure 7A:
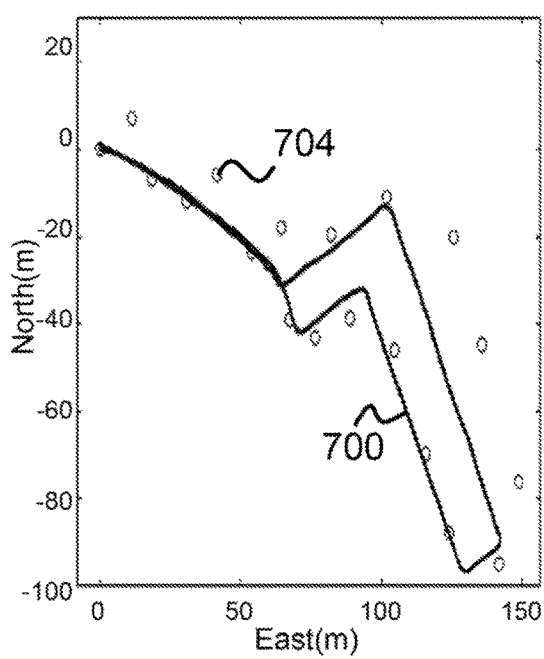
FIG. 7A is a plot chart depicting a comparison of calculated trajectories (in two-dimensions) using the procedure according to the present disclosure and that of existing prior art techniques.
Figure 7B:
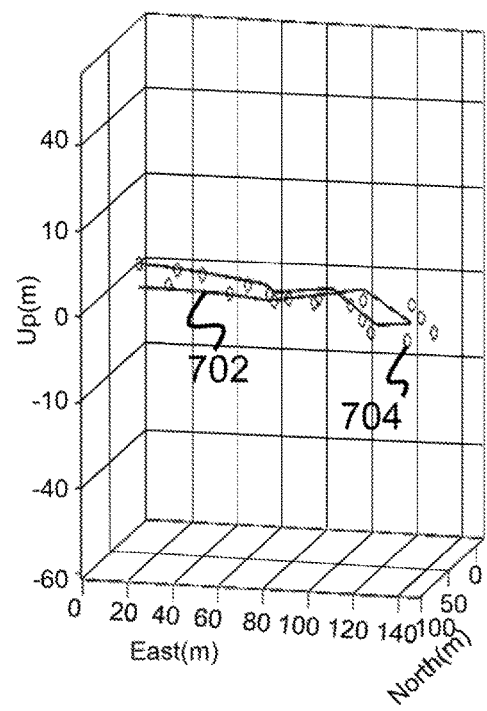
FIG. 7B is a plot chart depicting a comparison of calculated trajectories (in three-dimensions) using the procedure according to the present disclosure and that of existing prior art techniques.

Based on the above equations, trajectories (i.e., position vectors) can be calculated from beginning to the end of the trip. For example, FIGS. 7A and 7B depict graphs that plot the calculated trajectory based on the above procedures. FIG. 7A plots the estimated trajectories 700 in two-dimensions, while FIG. 7B plots the calculated trajectories 702 in three-dimensions. The dots 704 illustrate the results from a conventional magnetometer based estimation technique (also referred to as MWD). As shown in FIG. 7A, the trip is depicted as beginning and ending at the same place, which is more accurate than prior art conventions. Nevertheless, it should be noted and as shown in FIG. 7B, the position estimation in the up (or down) direction still has some small errors. The following sections provide additional procedures that can be implemented in the system to further improve trajectory estimation in all directions.

(4.7) Improving Attitude and Trajectory Estimation incorporating Magnetometer Reading at Each Step.

The attitude estimation described above in Section 4.4 may be improved if a magnetometer reading is available at each step. The scheme of its implementation is based on the fact that the magnetometer reading is the magnetic vector projected on the body frame of the magnetometer sensors. Since the body frame is determined from the A, I, and T, these three Euler angles can be used to estimate, at each time-step, the magnetometer reading with the following equation:

$$B^b(t) = C_n^b(t) B^n(t).$$

The aforementioned equation includes the estimated magnetometer vector $B^b(t)=[B_x^b, B_y^b, B_z^b]^T$ and the DCM matrix $$C_n^b(t) = [C_b^n(t_0)]^T = \begin{bmatrix} cAcIcT - sAsT & -cAcIsT - sAcT & cAsI \\ sAcIcT + cAsT & cAcT - sAcIsT & sAsI \\ -sIcT & sIsT & cI \end{bmatrix}^T,$$

are determined according to the process described in Section 4.4, and the magnet vector $B^n(t)=[B_N^n, B_E^n, B_D^n]^T$.

Since the $B^n(t)$ is not very sensitive to the positions of the sensor if the sensor's distance movement are within a mile, it may be assumed that the vector is the same as at the beginning. If the travelled distances are longer, the accuracy of the magnetic vector $B^n(t)$ can be improved by referring to the new position vector calculated above in Section 4.6. The reference can be either a look-up-table of the magnet vector vs. positions, or an earth magnetic model, such as the High-Definition-Geomagnetic-Model as provided by the National Oceanic and Atmospheric Administration.

The attitude improvement at each step can be realized by minimizing the square of the difference between the estimated and the measured magnetometer readings, i.e., finding A, I, and T, in minimizing the following:

$$|B_{measured}^b - B_{estimated}^b|^2 = |B_{measured}^b - C_n^b(t)B^n(t)|^2.$$

Figure 8:
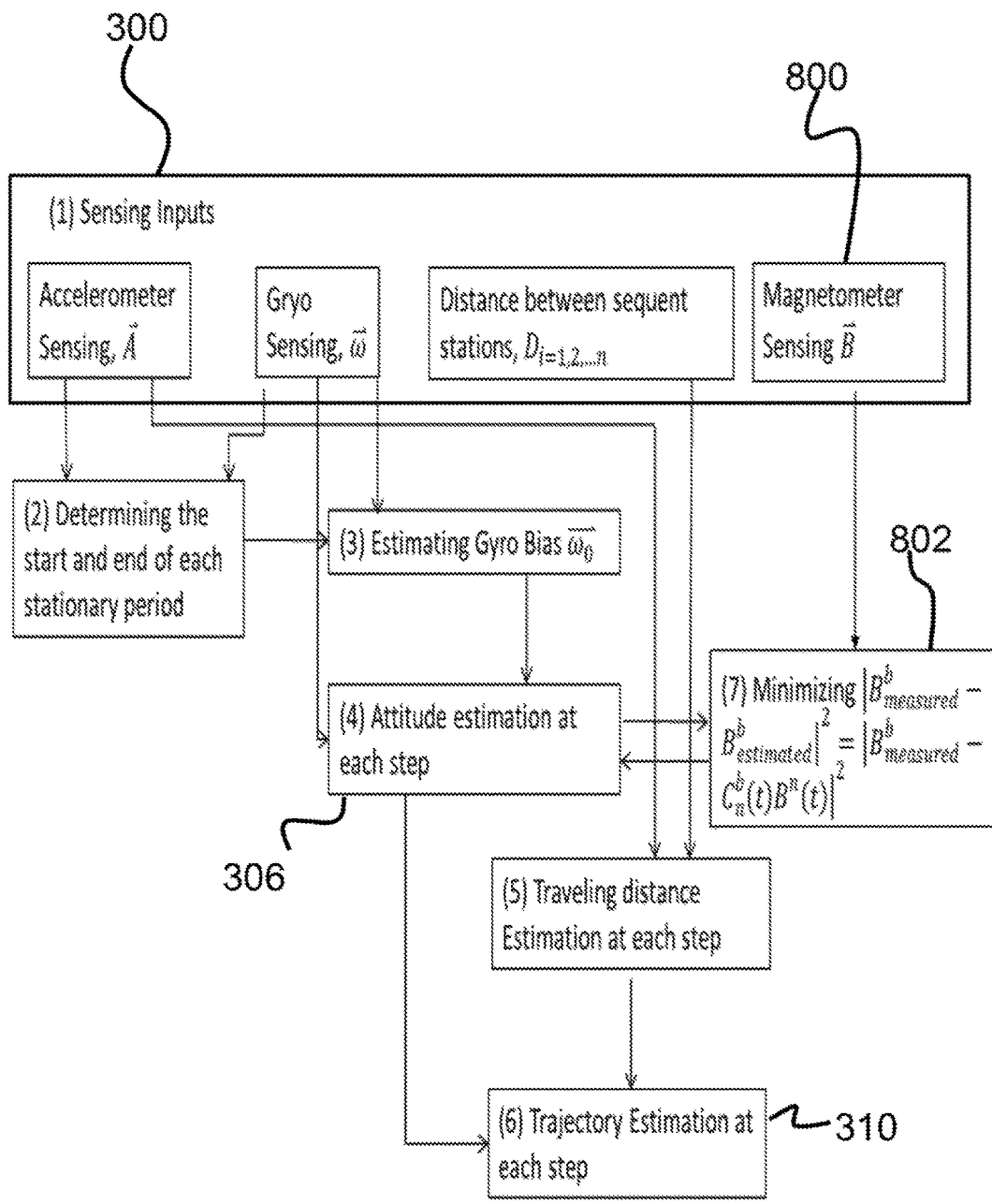
FIG. 8 is a flow chart illustrating an example embodiment of the system according to the present disclosure, implemented with a magnetometer reading.

This process is further depicted in FIG. 8. Specifically, FIG. 8 depicts the process by which attitude 306 and trajectory 310 estimation is improved using magnetometer readings 800 at each step. The process is similar to that as shown in FIG. 3, except that the magnetometer readings 800 are acquired as inputs 300. As noted above, the attitude 306 improvement at each step can be realized by minimizing 802 the difference between the estimated and the measured magnetometer readings. This results in an improved attitude 306 and resulting improved trajectory estimation 310.

(4.8) Improving Trajectory Estimation Incorporating Inertial Navigation Scheme with Kalman Filtering.

Figure 9:
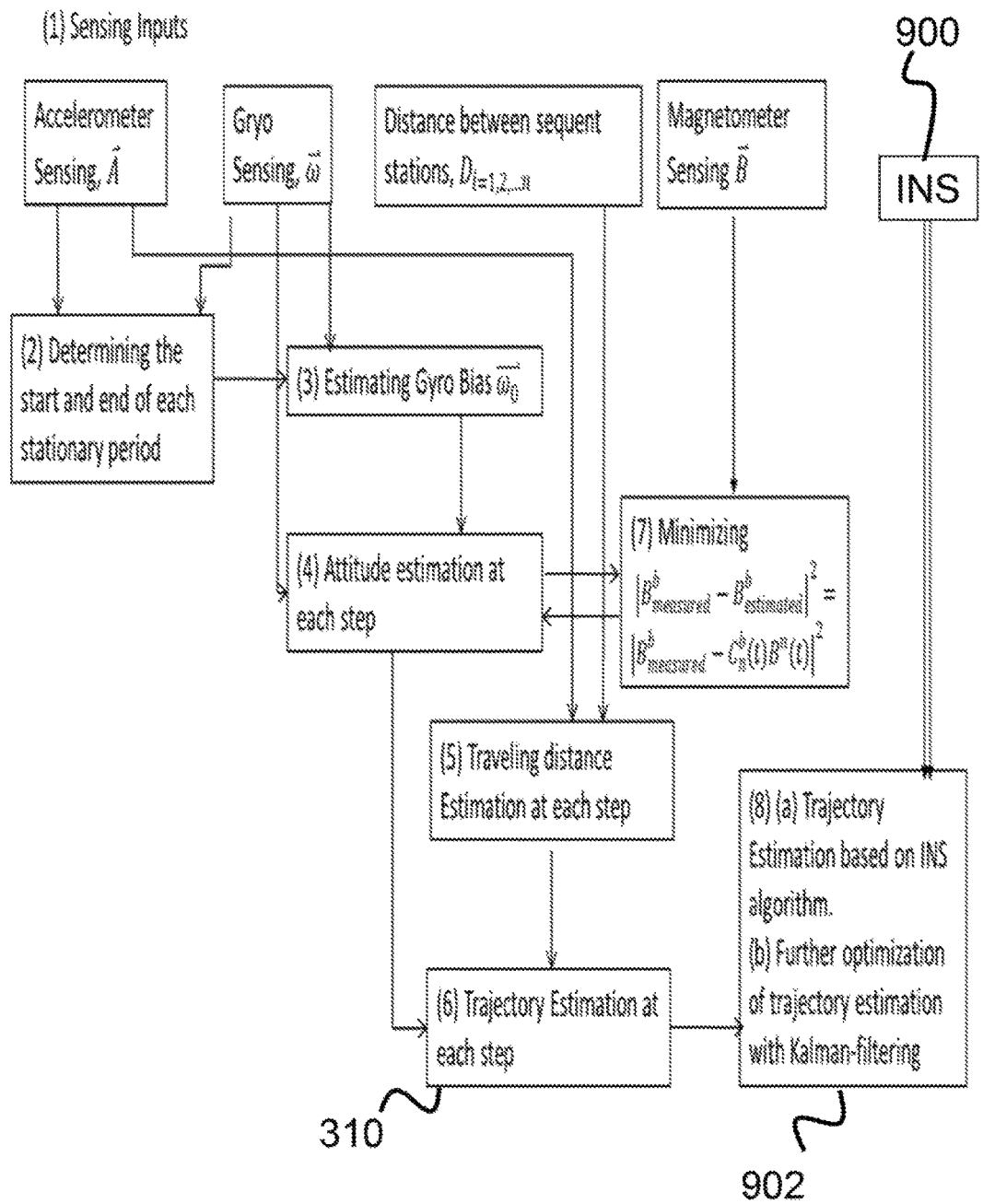
FIG. 9 is a flow chart illustrating a process according to various embodiments of the present invention in which the system incorporates an inertial navigation scheme with Kalman filtering.

In some embodiments and as shown in FIG. 9, the system described herein can be further improved through incorporating an inertial navigation scheme with Kalman filtering. The process as described above and illustrated in FIGS. 3 and 8 provides trajectory estimation 310 at each step. As understood by those skilled in the art, a second trajectory can also be separately estimated using the accelerometer and gyro data based on the inertial navigation scheme (INS) 900 (see Literature Reference No. 4).

Further, the accuracy of trajectory estimation can be further improved with the employment of Kalman filtering. Thus, in some embodiments, the estimated trajectory 310 from incremental trajectory estimation (ITE) can be combined with the weighted sum (i.e., weighted combined trajectory) of the estimated trajectory from the ITE, and the estimated trajectory based on the INS.

(4.9) Improving ITE (Incremental Trajectory Estimation) with Continuous ΔD Measurement.

Figure 10:
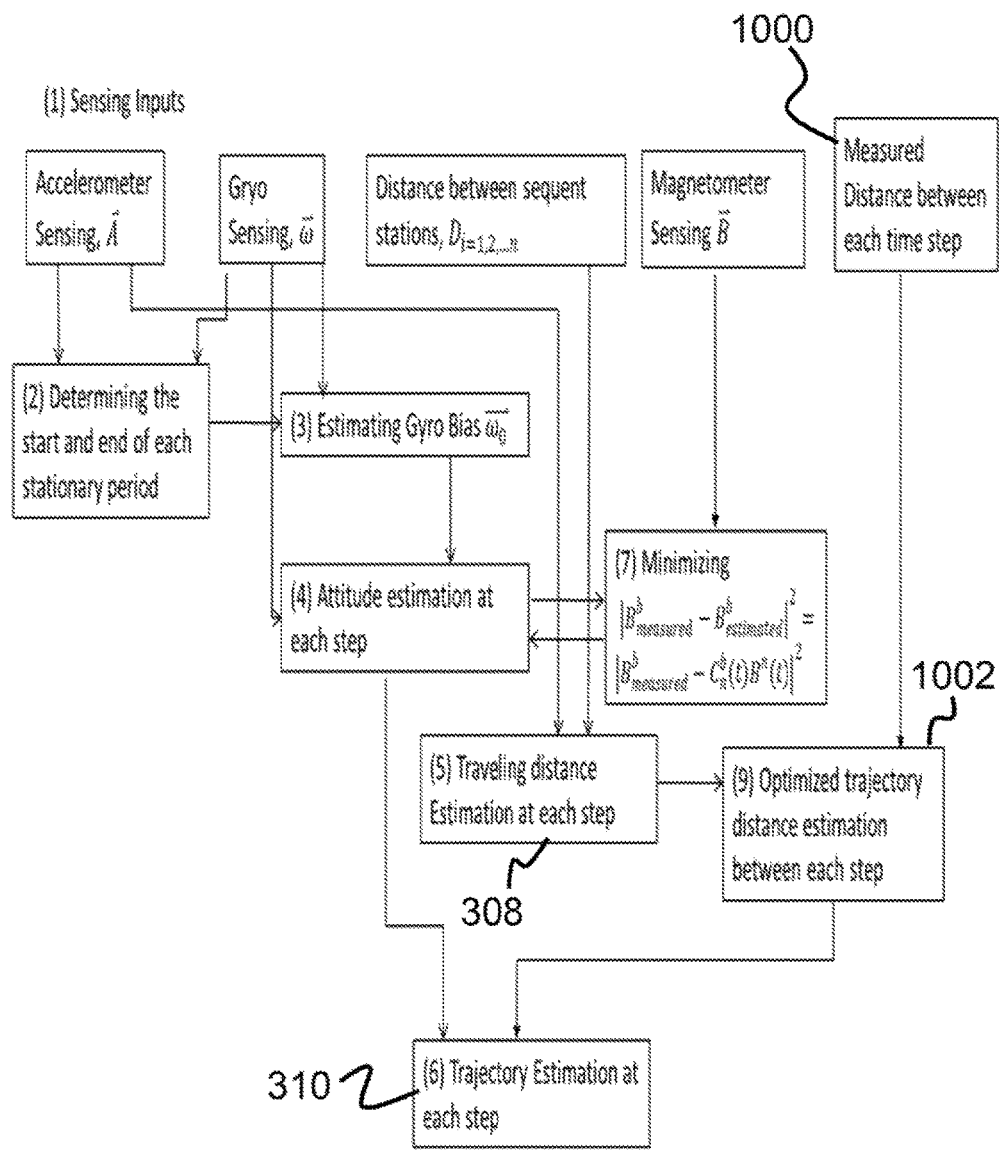
FIG. 10 is a flow chart illustrating a process according to various embodiments of the present invention.

In certain applications, continuing measurements of the travelling distance between each step is available. For example, in a vehicle application, odometer measurements are available based on motion of the vehicle's wheels. In such a scenario and as shown in FIG. 10, the incremental trajectory estimation 310 can be improved based on the measured distance 1000 between each time step.

For example, the traveling distance between each step can be optimized 1002 by weighting the travelling distance estimation 308 (described above in Section 4.5) and the travelling distance measurement 1000 with the following formula:

$$TD_{opt} = \frac{\sigma_{mea}^2}{\sigma_{est}^2 + \sigma_{mea}^2} TD_{est} + \frac{\sigma_{est}^2}{\sigma_{est}^2 + \sigma_{mea}^2} TD_{est}.$$

The standard deviation of the measurement and the estimated travelling distance are $\sigma_{mea}$ and $\sigma_{est}$, respectively. In other words, the estimated travel distance 308 between each time step is optimized based on actual measurements 1000 to provide an improved trajectory estimation 310 at each step.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for incremental trajectory estimation of an implement, the system comprising:
    one or more processors and a memory, the memory being a non-transitory computer-readable medium having executable instructions encoded thereon, such that upon execution of the instructions, the one or more processors perform operations of:
        determining a time span of each stationary period of the implement based on accelerometer and gyroscopic data;
        estimating gyroscopic bias based on the time span and gyroscopic data;
        estimating attitude at each time step based on the estimated gyroscopic bias, accelerometer and gyroscopic data, wherein each time step is a time measurement between stationary periods;
        estimating a traveling distance of the implement at each time step;
        estimating at least one of a first trajectory of the implement based on the estimated attitude and traveling distance, a second trajectory of the implement, a weighted combined trajectory of the implement, and an optimized trajectory of the implement; and
        causing the implement to alter direction based on at least one of the first trajectory, the second trajectory, the weighted combined trajectory, and the optimized trajectory.

2. The system as set forth in claim 1, wherein in estimating attitude at each time step, the attitude is further based on a minimization of a difference between estimated and measured magnetometer readings.

3. The system as set forth in claim 2, wherein estimating the weighted combined trajectory includes combining the estimated first and second trajectories using a weight parameter to generate the weighted combined trajectory.

4. The system as set forth in claim 3, wherein estimating the optimized trajectory further includes generating the optimized trajectory estimate based on Kalman filtering of the weighted combined trajectory.

5. The system as set forth in claim 4, further comprising an operation of optimizing the estimated traveling distance at each time step through weighting of initial travelling distance estimation and a traveling distance measurement.

6. The system as set forth in claim 1, wherein the implement is selected from a group consisting of drilling platform and a vehicle.

7. The system as set forth in claim 1, wherein estimating the traveling distance, the traveling distance is determined based on a velocity distribution over time.

8. The system as set forth in claim 1, wherein estimating the traveling distance, the traveling distance is calculated using a sine wave approximation between two stations as a function of time.

9. A computer program product for incremental trajectory estimation of an implement, the computer program product comprising:
    a non-transitory computer-readable medium having executable instructions encoded thereon, such that upon execution of the instructions by one or more processors, the one or more processors perform operations of:
        determining a time span of each stationary period of the implement based on accelerometer and gyroscopic data;
        estimating gyroscopic bias based on the time span and gyroscopic data;
        estimating attitude at each time step based on the estimated gyroscopic bias, accelerometer and gyroscopic data, wherein each time step is a time measurement between stationary periods;
        estimating a traveling distance of the implement at each time step;
        estimating a first trajectory of the implement based on the estimated attitude and traveling distance; and
        causing the implement to alter direction based on the first trajectory estimate.

10. The computer program product as set forth in claim 9, wherein in estimating attitude at each time step, the attitude is further based on a minimization of a difference between estimated and measured magnetometer readings.

11. The computer program product as set forth in claim 10, wherein estimating the weighted combined trajectory includes combining the estimated first and second trajectories using a weight parameter to generate the weighted combined trajectory.

12. The computer program product as set forth in claim 11, wherein estimating the optimized trajectory further includes generating the optimized trajectory estimate based on Kalman filtering of the weighted combined trajectory.

13. The computer program product as set forth in claim 12, further comprising an operation of optimizing the estimated traveling distance at each time step through weighting of initial travelling distance estimation and a traveling distance measurement.

14. The computer program product as set forth in claim 9, wherein the implement is selected from a group consisting of drilling platform and a vehicle.

15. The computer program product as set forth in claim 9, wherein estimating the traveling distance, the traveling distance is determined based on a velocity distribution over time.

16. The computer program product as set forth in claim 9, wherein estimating the traveling distance, the traveling distance is calculated using a sine wave approximation between two stations as a function of time.

17. A computer implemented method for incremental trajectory estimation of an implement, the method comprising an act of:
    causing one or more processors to execute instructions encoded on a non-transitory computer-readable medium, such that upon execution, the one or more processors perform operations of:

determining a time span of each stationary period of the implement based on accelerometer and gyroscopic data;

estimating gyroscopic bias based on the time span and gyroscopic data;

estimating attitude at each time step based on the estimated gyroscopic bias, accelerometer and gyroscopic data, wherein each time step is a time measurement between stationary periods;

estimating a traveling distance of the implement at each time step;

estimating a first trajectory of the implement based on the estimated attitude and traveling distance; and causing the implement to alter direction based on the first trajectory estimate.

18. The computer implemented method as set forth in claim 17, wherein in estimating attitude at each time step, the attitude is further based on a minimization of a difference between estimated and measured magnetometer readings.

19. The computer implemented method as set forth in claim 18, wherein estimating the weighted combined trajectory includes combining the estimated first and second trajectories using a weight parameter to generate the weighted combined trajectory.

20. The computer implemented method as set forth in claim 19, wherein estimating the optimized trajectory further includes generating the optimized trajectory estimate based on Kalman filtering of the weighted combined trajectory.

21. The computer implemented method as set forth in claim 20, further comprising an operation of optimizing the estimated traveling distance at each time step through weighting of initial travelling distance estimation and a traveling distance measurement.

22. The computer implemented method as set forth in claim 17, wherein the implement is selected from a group consisting of drilling platform and a vehicle.

23. The computer implemented method as set forth in claim 17, wherein estimating the traveling distance, the traveling distance is determined based on a velocity distribution over time.

24. The computer implemented method as set forth in claim 17, wherein estimating the traveling distance, the traveling distance is calculated using a sine wave approximation between two stations as a function of time.

* * * * *